UNITED STATES PATENT OFFICE.

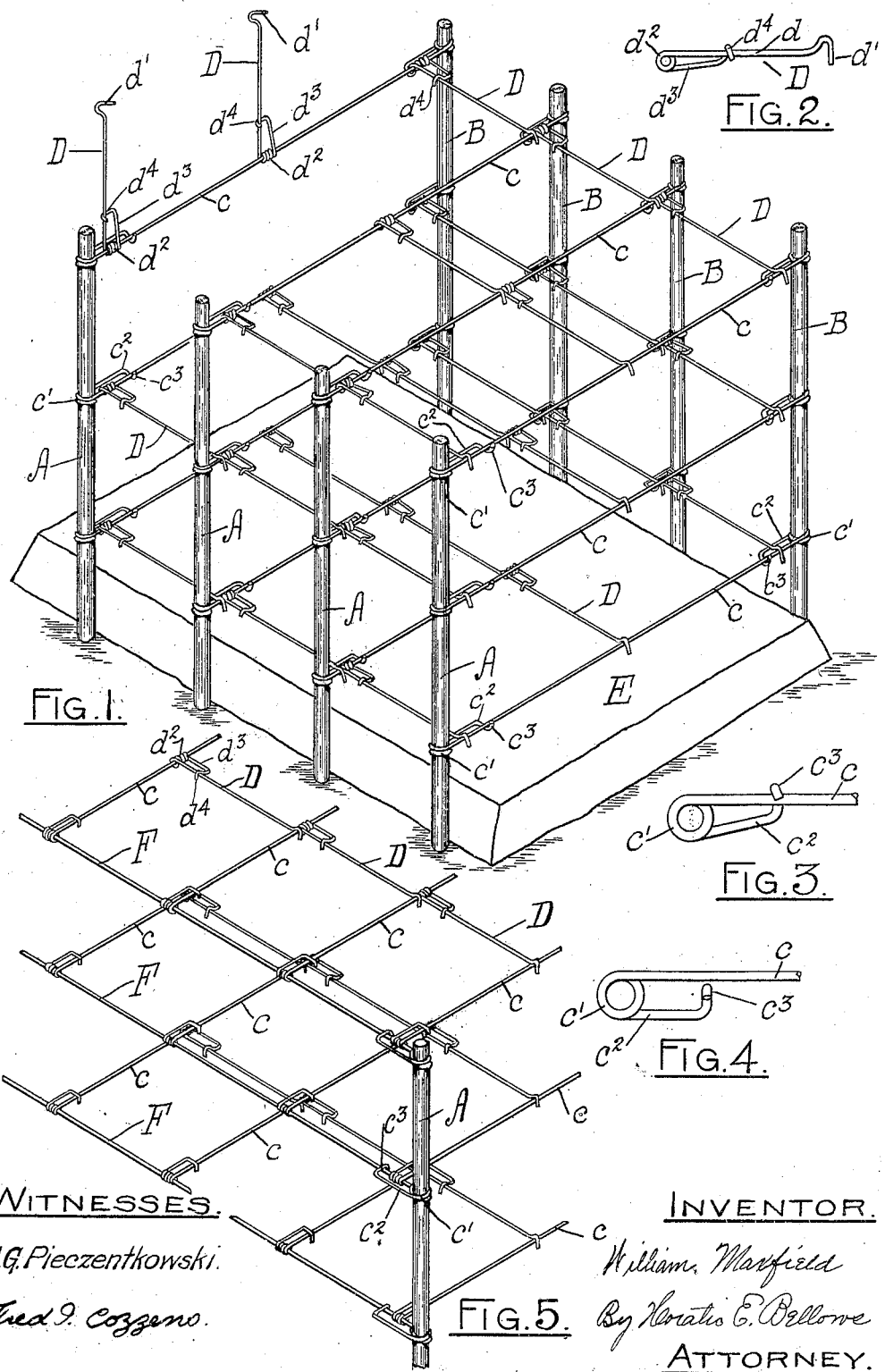

WILLIAM MAXFIELD, OF BARRINGTON, RHODE ISLAND, ASSIGNOR OF ONE-HALF TO WILLIAM C. DIMOND, OF WARREN, RHODE ISLAND.

DEVICE FOR SUPPORTING PLANTS.

No. 836,328.

Specification of Letters Patent.

Patented Nov. 20, 1906.

Application filed March 30, 1906. Serial No. 309,008.

*To all whom it may concern:*

Be it known that I, WILLIAM MAXFIELD, a citizen of the United States, residing at Barrington, in the county of Bristol and State of Rhode Island, have invented certain new and useful Improvements in Devices for Supporting Plants, of which the following is a specification, reference being had therein to the accompanying drawings.

My invention relates to means for supporting plants during their growing period, and has for its essential objects cheapness, durability, compactness, and facile adjustability.

An important object is to attain these ends by a device which shall cast a minimum of shade upon the flower.

To the above ends my invention consists in mounting upon marginal horizontal wires or vertical posts vertically or horizontally adjustable transverse bars.

It further consists in providing each transverse arm with means for engaging adjacent transverse bars and in providing a novel locking means for assembling the parts.

In the drawings which constitute a part of this specification, Figure 1 is a perspective view of a supporting device embodying my invention; Fig. 2, a side elevation of one of the pivoted arms; Fig. 3, a detail of one of the engaging loops in closed position; Fig. 4, a similar view of the same in open or unlocked position, and Fig. 5 a perspective view of a modified form of my device.

Like reference-letters indicate like parts throughout the views.

An approved embodiment of my invention comprises a plurality of frames adapted to mounting across a flower-bed parallel with and engaging each other, each comprising vertical posts A and B, joined by a series of transverse rods $c$. In the drawings three only of such bars are shown; but the number is optional. The ends of these rods, as shown in Fig. 4, are bent into a single spiral spring-ring $c'$ and the free end of the bar then continued a distance parallel to the rod-body to form a short arm $c^2$ and then directed at a right angle to its former direction and bent to form a transverse hook $c^3$. The spring-rings $c'$ are pushed down over the posts A and B and when at the desired height are tightened or locked into position by placing the hook $c^3$ over the bar $c$. The bars $c$ by unlocking may be vertically adjusted to the height desired for any particular floral growth.

At intervals along each transverse bar are pivotally-mounted hooked arms, each represented in a general way by D. In detail these arms comprise, as shown in Fig. 2, a shaft or body $d$, provided upon its outer or free extremity with a hook $d'$ and looped upon its opposite end into a spiral spring-ring $d^2$, the last loop of the ring being continued a distance parallel with the shaft $d$ to form an arm $d^3$, then transversely bent to form a hook $d^4$. The hook $d^4$ is placed over and engages the shaft $d$, thereby contracting the ring $d^2$, whereby the ring exerts sufficient spring-pressure upon the wire $c$, upon which it is mounted, to support the hooked arm D in whatever radial plane may be desired. When unlocked, the members D may be slid laterally to whatever position the foliage of the flower may demand.

Fig. 1 shows a plurality of the described frames erected in series over a flower-bed E. The frames are so interspaced that when the hooked arms D are horizontal their hooked free ends $d'$ engage the transverse bars $c$ of the next adjacent frame.

In actual use only the lowest tier of hooked arms D is in engagement with the adjacent frame when the flowers are of low growth, arms D of all the upper tiers being preferably vertical, as are the members of the end frame. (Shown in Fig. 1.) As the plants increase in height the hook members of the upper tiers are successively lowered and engaged. The adaptability of the arms D for vertical arrangement not only economizes space in storing, but minimizes the amount of shadow cast.

It is to be understood that for the purposes of illustration the diameters of the posts A and B in the drawings are larger than intended for actual use and that the number of hooked arms shown is less than is usually required.

In Fig. 5 is shown a modified form of this invention wherein for the series of side posts is substituted a series of longitudinally-arranged bars F, with their ends engaging end posts A', to which are engaged the transverse rods $c$.

What I claim is—

1. A device of the type set forth comprising a plurality of interspaced frames, each frame comprising posts, transverse rods uniting the posts, and hooked members mounted upon the transverse rods of each frame and interlocking with the transverse rods of the next adjacent frame.

2. In a device of the type set forth, the combination with posts, of transverse rods, spring-rings upon the ends of the rods embracing the posts, and means upon the rings adapted to engage the rods and lock the rings upon the posts.

3. In a device of the type set forth the combination with posts, of transverse rods uniting the posts, arms provided with spring-loops which embrace the rods, and means upon the loops adapted to bind the arms upon the rods.

4. In a device of the type set forth, the combination with posts of longitudinally-disposed rods connecting the posts, transverse rods connecting the longitudinally-disposed rods, and hooked members mounted upon and interlocking the adjacent transverse rods.

5. In a device of the type set forth, the combination with the transverse rods and means for supporting the same, of a series of hooked arms, each of said arms comprising a shaft provided with a hook upon one end and having its opposite end bent into spiral coils inclosing one of the rods, one loop of the ring being continued to form an arm, and a hook upon the end of the arm adapted to engage the shaft and contract the coil upon the rod by spring-pressure.

6. In a device of the type set forth the combination with the posts, of a plurality of transverse rods, spiral spring-rings upon both ends of each rod formed from the material of the rod and inclosing the posts, arms formed by the extension of one of the spirals of each ring and a hook upon each arm adapted to engage the rod and contract the rings upon the posts by spring-pressure.

In testimony whereof I have affixed my signature in presence of two witnesses.

WILLIAM MAXFIELD.

Witnesses:
  HORATIO E. BELLOWS,
  FRED IRVIN COZZENS.